Feb. 13, 1973  G. B. GORDON  3,716,703
METHOD AND APPARATUS FOR INTERRUPTING CONTINUOUS PULSE
TRAINS FOR COUNTER READOUT WITHOUT INFORMATION LOSS
Filed March 9, 1970  4 Sheets-Sheet 1

INVENTOR.
GARY B. GORDON
BY Roland D. Griffin
ATTORNEY

INVENTOR
GARY B. GORDON
BY Roland I. Griffin
ATTORNEY

United States Patent Office 3,716,703
Patented Feb. 13, 1973

3,716,703
METHOD AND APPARATUS FOR INTERRUPTING CONTINUOUS PULSE TRAINS FOR COUNTER READOUT WITHOUT INFORMATION LOSS
Gary B. Gordon, Cupertine, Calif., assignor to Hewlett-Packard Company, Palo Alto, Calif.
Filed Mar. 9, 1970, Ser. No. 17,529
Int. Cl. G06m 3/04
U.S. Cl. 235—92 PL
18 Claims

ABSTRACT OF THE DISCLOSURE

A pulse counter system for determining the difference tally count between the pulses of two continuous trains of incoming pulses with an up-down counter includes means for interrupting the flow of pulses to the counter to allow time for the counter to stabilize and be read out, said means accounting for said interrupted pulses to avoid losing information. In one instance, an equal number of pulses is interrupted from each of the up count and down count trains, so that no information is lost in the counter. In another instance, the interrupted pulses are counted in an auxiliary up-down counter, the difference count being taken from the auxiliary counter and digitally added into the main counter after each readout of the main counter. In another embodiment, the difference count of the pulses in the interruption period is kept in the auxiliary counter, the output of the main counter and the auxiliary counter being added together digitally to give the count output. In another embodiment anticoincidence circuitry and gates are used for feeding the interrupted pulses serially back into the main counter from the auxiliary counter after each readout of the main counter to accomplish addition. Also, two up-counters plus a subtraction circuit may be used to perform the functions of a reversible or up-down counter and anticoincidence circuitry.

BACKGROUND OF THE INVENTION

In conventional frequency counting systems a gate at the input of the counter is opened for a fixed period of time, for example, one second, to permit the incoming train of pulses to pass to the counter. At the end of the fixed time period, the gate is closed and the number of counts stored in the counter will determine the frequency in cycles per second. After the gate at the input has been turned off, a short delay period is provided before the readout of the counter to permit the carry pulses to ripple down the counter and the counter to stabilize to the final count.

There are instances of counting where the incoming train of pulses may not be interrupted because information is carried by the summation of all the pulses, instead of their frequency. For example, in laser interferometer systems each change in length of say a quarter wavelength of light, approximately 6μ inches, is indicated by a one pulse input to the frequency counter. Each pulse lost at the input of the counter, therefore, would mean an error in the distance measurement of 6μ inches. It is desirable, however, to be able to read out the counter periodically during receipt of the incoming train of pulses. The problem is, then, to read out the contents of the counter without interrupting the flow of input pulses to the counter. The difficulty is that when conventional ripple-carry counters are used errors can occur during readout because the most significant digits of the counter are counting ahead of the least significant digits. The time it takes for carries to ripple down the counter is much longer than the minimum time interval between input pulses to be counted. The counter contents are said to be skewed.

One solution is to use a high speed ripple carry counter which will stabilize within a relatively short period of time, for example, one microsecond, and lower the permitted rate of the incoming pulses from the interferometer, for example, to 1 mHz. This permits the counter to stabilize and be sampled within a time period (1 microsecond) between successive incoming pulses, and readout can safely take place at the end of this time period.

Another method consists of using elaborate carry-look-ahead counters, which anticipate the generation of carries. They can be made to assimilate carries as fast as incoming pulses are received to be counted, and skew-free readout is possible.

Both the high speed ripple carry counter approach and the carry-look-ahead approach have shortcomings; the former lacks speed and the latter is unduly elaborate. It is the intent of the present invention to offer the speed advantages of the carry-look-ahead counter combined with the economy of the ripple carry counter.

Two frequency, AC laser interferometer systems employ an up-down or reversible counter to count both incoming reference frequency pulses and incoming comparison frequency pulses and to subtract one pulse count from the other pulse count to give an output frequency equal to the difference frequency between the reference and comparison frequencies. Such up-down counter applications need anticoincidence circuitry at their input to properly process both trains of incoming pulses so that up-count pulses are not time-coincident with down-count pulses. Such anticoincident circuitry renders the reversible counter more complex and expensive than two ordinary up-counters alone, which are used in one embodiment of the present invention.

SUMMARY OF THE INVENTION

It is the object of the present invention to provide a system that will permit the sampling and readout of a reversible counter, which is counting a pair of continuous incoming trains of pulses, without the loss of any information contained in the incoming pulse trains during the interruption period for reading out the counter. In addition, a pair of simple up-counter circuits may be utilized for counting the pulses of two different incoming trains of pulses with a subtractor circuit utilized for subtracting the counter from the other counter to obtain the same difference count as would be obtained from a more complex conventional reversible or up-down counter system and pulse anticoincidence circuitry.

Conventional pulse counter circuits with relatively slow carry ripple times are utilized in counting continuous trains of incoming pulses while permitting sampling of the pulse count at any convenient time. In one embodiment, this is accomplished by utilizing a selective pulse remover circuit in each of the incoming pulse paths to a reversible counter. Each selective pulse remover is designed to intercept a preselected equal number of pulses, for example, nine or ten, from each train, each selective pulse remover operating after receipt of the last pulse of the preselected number to redirect the next and future incoming pulses directly to the reversible counter. Since each selective pulse remover circuit removes an identical number of pulses from each train, the output of the reversible counter is the same as if the pulse trains had not been interrupted. During the interval of time that the incoming trains of pulses are interrupted, the reversible counter will have time to stabilize and be read out.

In lieu of the conventional reversible counter, which requires an anticoincidence circuit, a pair of conventional up-counters may be utilized for counting the two separate incoming trains of pulses, the output of the two up-counters being transmitted to a subtraction circuit where the two different counts may be subtracted to give the same count output as a conventional reversible counter. Since many systems utilizing reversible counters have subtraction logic circuitry already incorporated therein, this available subtraction circuitry may be utilized.

In another embodiment of the present invention, the pulses which are incoming during the interruption period are counted in an auxiliary up-down counter while the main counter is stibilizing and being read, the difference pulse count from the auxiliary counter being transferred into a storage means after the flow of pulses has been redirected from the auxiliary counter back to the main counter. Thereafter, when the flow of pulses to the main counter is again interrupted and directed to the auxiliary counter, to permit stabilization and readout of the main counter, the pulse count from the storage means is digitally added to the pulse count in the main counter to update the main counter digital count.

In another embodiment, two conventional ripple carry up-down counters are employed, one serving as the main or principal counter and the other serving as the auxiliary counter. After each period that the auxiliary counter is used to count the incoming pulses, the auxiliary counter is permitted to stabilize and its difference count is then transferred to a storage means. During each period that the flow of pulses is interrupted to the main counter to allow it to stabilize and be read out, the stabilized count output of the main counter is added to the stabilized auxiliary count in the storage means to give an updated total digital output.

A pair of anticoincidence circuits are utilized in another embodiment to feed the pulses that are stored in the auxiliary counter during the stabilizing and readout period, i.e. the interruption time, of the main counter back into the main counter along with the flow of incoming pulses to the main counter after each interruption period, whereby the main counter is updated before the next stabilizing and readout period.

DESCRIPTION OF THE PREFERRED EMBODIMENTS

Figure 1:
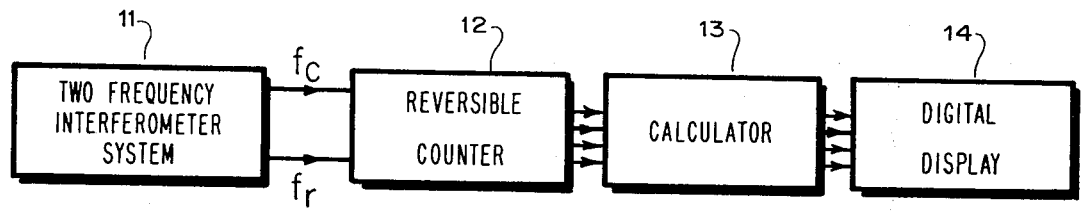
FIG. 1 is a block diagram of a conventional counter system for a two frequency interferometer system.

Referring now to FIG. 1, there is shown a block diagram of a two frequency, AC laser interferometer system of the type shown and described in U.S. Pat. 3,458,259 issued on July 29, 1969, to Alan S. Bagley et al., entitled "Interferometric System." The output of the laster interferometer 11 comprises a pair of radio frequency signals, a reference frequency, $f_r$, and a comparison or measurement frequency, $f_c$. Reference frequency, $f_r$, is a constant frequency of, for example, 2 mHz., and comparison frequency, $f_c$, varies in accordance with the change in length of the distance being measured by the interferometer. When there is no change in length, $f_c=f_r=2$ mHz., while $f_c$ will vary up and down from 2 mHz. with increasing and decreasing measured lengths. For example, $f_c$ will vary one Hz. for each fringe or one quarter wavelength of light variation in the measured distance per second.

The two frequencies $f_c$ and $f_r$ are transmitted to an up-down or reversible counter 12 which up counts one frequency and down counts the other frequency, the output of the counter being the distance in fringes.

The output of the counter 12 is transmitted to a calculator or computer circuit where the counter output is converted to lengths in inches or millimeters, or to velocity of the distance change in inches or millimeters per second. These calculated values are then transmitted to a digital display means 14 where the values are reproduced on a series of display tubes for observation by the operator. In this system it is important that none of the cycles of the two incoming frequencies $f_c$ and $f_r$ is lost, since this would result in inaccuracy in the reading of the distance by the interferometer. However, it is desirable to read out the counter during the time the continuous pulse trains are being received by the counter 12. This readout could be accomplished by lowering the rate of $f_c$ and $f_r$ to .5 mHz. or less and utilizing a high speed ripple carry counter for the reversible counter 12. Alternatively $f_c$ and $f_r$ could be left at 2 mHz. and elaborate carry-look-ahead counters could be employed.

Figure 2:
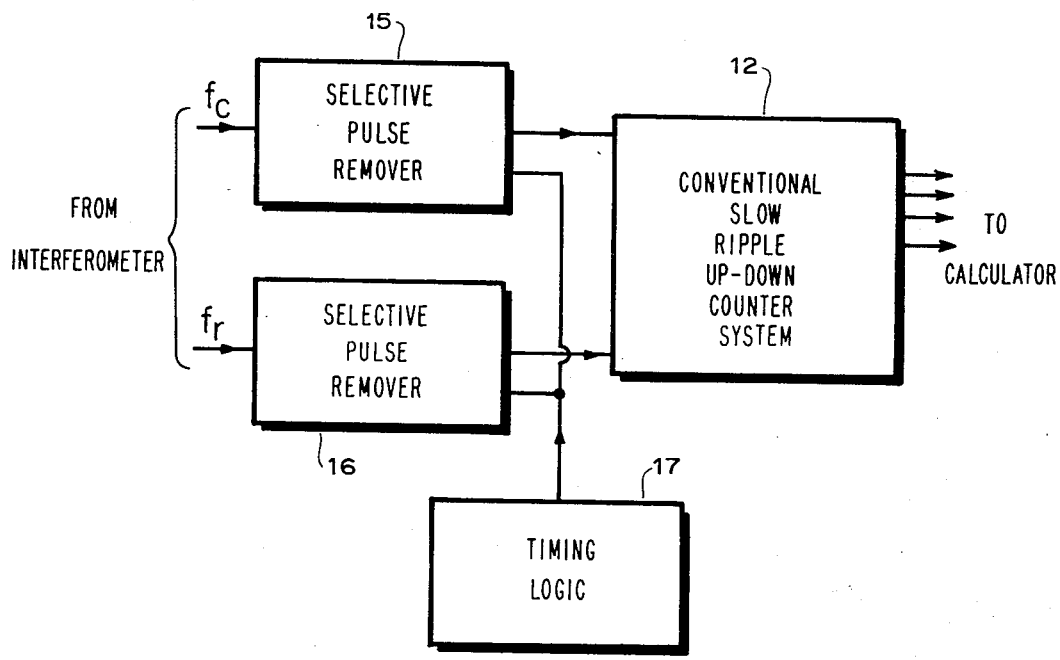
FIG. 2 is a block diagram of the selective pulse remover system of one embodiment of the present invention.
Figure 3:
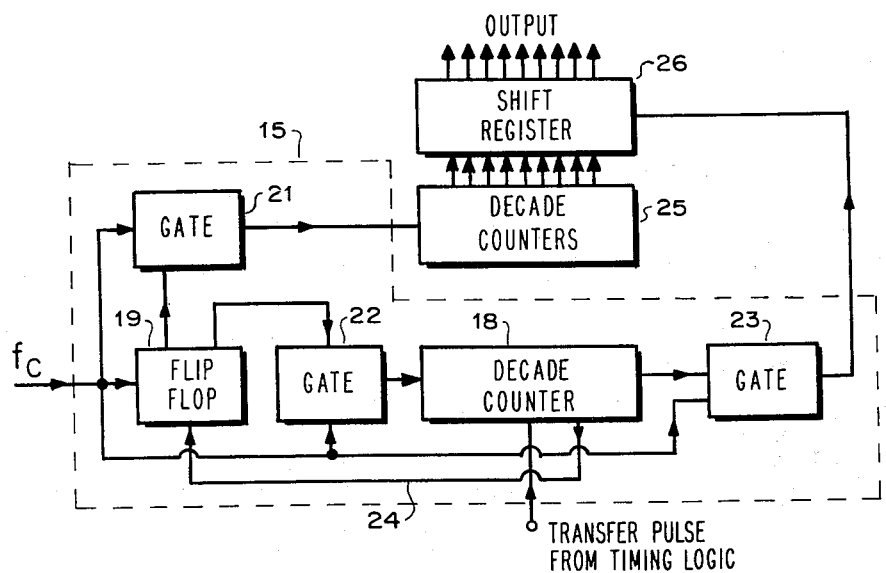
FIG. 3 is a block diagram of one form of selective pulse remover circuitry that may be utilized in the present invention.

FIGS. 2 and 3 disclose a system whereby a conventional slow ripple carry reversible counter may be utilized and the incoming pulses interrupted without the loss of information. This system includes a pair of selective pulse remover circuits 15 and 16, the pulse remover circuits being coupled to the timing logic circuit 17 of the system. The selective pulse remover 15 is located in the path of the pulse train $f_c$ while the selective pulse remover 16 is in the incoming path of the pulse train, $f_r$. The outputs of the selective pulse removers couple to the two inputs of a conventional slow ripple up-down counter 12, containing its own pulse anticoincidence circuit.

When the existing count of the counter 12 is to be sampled, the timing logic circuit 17 transmits a transfer pulse to the two selective pulse removers 15 and 16. These pulse removers operate to interrupt a preselected number of incoming pulses in each of the pulse trains $f_c$ and $f_r$, a typical pulse number being 9 or 10. After the receipt of the last pulse of the preselected number, the selective pulse remover then operates to transmit the following pulses directly through to the input of the counter 12. Since each pulse remover 15 and 16 interrupts the same number of pulses from each frequency train, the output of the counter 12 is the same as if the preselected number of pulses of each train had been subtracted in the conventional up-down counter 12. Therefore, no information is lost by intercepting this equal number of pulses from each train.

FIG. 3 discloses one system for performing the functions of the selective pulse remover. The selective pulse remover 15 comprises a decade counter 18, a flip-flop circuit 19, and three gates 21, 22 and 23. When it is desired to read the output count of the reversible counter, a transfer pulse is sent to the decade counter 18 which sets the decade counter to the zero decimal state, placing a change in state on the lead 24 to allow flip-flop 19 to set on receipt of the next input $f_c$. Flip-flop 19 operates to close the gate 21 to prevent the pulse train $f_c$ from reaching the decade counters 25. The flip-flop also opens gate 22 to permit the next incoming pulses of pulse train $f_c$ to pass into the decade counter 18. The decade counter 18 counts the next eight pulses and, on receipt of the eighth pulse, opens gate 23 and also allows flip-flop 19 to operate on the trailing edge of the ninth pulse to open gate 21 and close gate 22 so that the tenth and subsequent pulses will be transmitted directly through gate 21 to the decade counters 25.

During the period of interruption of the pulses the decade counters 25 have a chance to let the carries ripple down the counter and the counter stabilize. The ninth pulse from the $f_c$ train is transmitted through the gate 23 to the shift register 26 to cause the count in the decade counters to be parallel transferred into the shift register and subsequently out to the calculator system.

The selective pulse remover 16 operates on the pulse train $f_r$ in similar fashion to remove nine pulses from this train of pulses and, since both selective pulse removers remove the identical number of pulses, no loss in information results at the output of the reversible counter.

Figure 4:
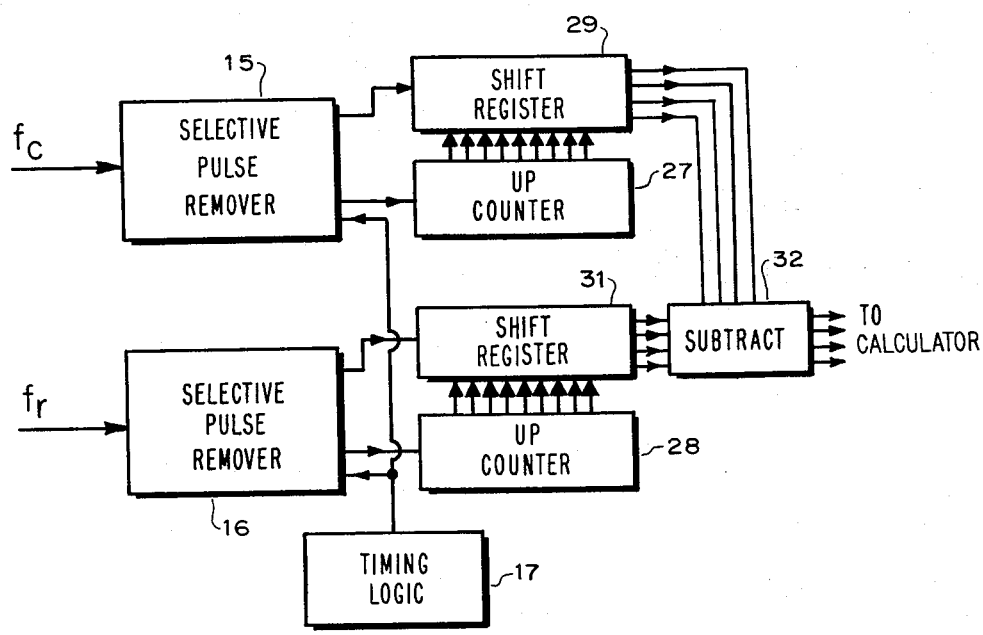
FIG. 4 is a block diagram of a system incorporating two up-counters in lieu of the conventional reversible counter.

Referring now to FIG. 4, there is shown a system whereby two conventional slow carry ripple up counters 27 and 28 may be utilized in place of the conventional slow ripple up-down counter 12. The conventional up-down counter 12 employs as a part of its circuitary an anticoincidence circuit. The two up-counter configuration of FIG. 4 does not need such a circuit and, since the interferometer system already includes a subtracting capability in its computer, the subtract circuit utilized by the two up counters is already available. The pulse trains $f_c$ and $f_r$ are both up counted, the totals parallel transferred to the shift registers 29 and 31, and the outputs of the registers sent to the subtraction circuit 32 where the difference in count is determined by subtracting one form the other. The output from the subtraction circuit is the identical output that is obtained from a conventional up-down counter.

Figure 5:
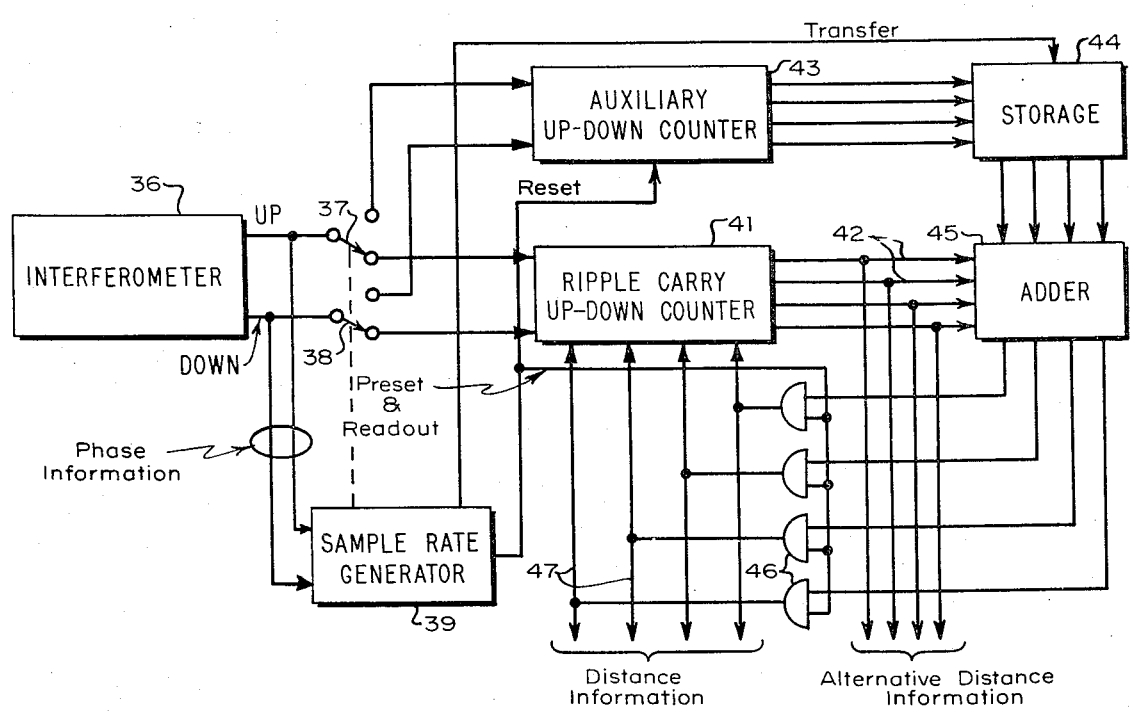
FIG. 5 is a block diagram of another embodiment of the present invention which employs an auxiliary up-down counter for accounting for the interrupted pulses.
Figure 5A:
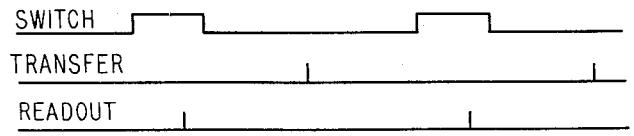
FIG. 5A is a pulse chart showing the timing of the various pulses of FIG. 5.

Referring now to FIGS. 5 and 5A the two pulse trains from the interferometer 36 are coupled to electronic switches 37 and 38 which are controlled from a sample rate generator 39, the sample rate generator receiving phase information from the pulse trains so that it will operate the electronic switches only at a suitable period between pulses in the incoming trains. During normal operation the pulse trains are coupled into the ripple carry up-down counter 41 where the up and down pulses are counted, the difference appearing as digital distance information on the output leads 42 of the counter. When it is desired that the counter 41 stabilize to be read out, the sample rate generator 39 operates the electronic switches 37 and 38 to switch the incoming pulse trains from the counter 41 to the auxiliary up-down counter 43 where the up and down pulses are counted. After the ripple carry up-down counter 41 is stabilized and has been read out as described below, the sample rate generator 39 again operates to switch the incoming pulse trains from the auxiliary counter 43 back to the main counter 41 until the next period when it is desired to read out the distance information from the main counter 41.

After the pulse trains have been switched back to the main counter 41 and the auxiliary counter 43 has had an opportunity to stabilize to its final count, a transfer pulse is sent from the sample rate generator 39 to the storage circuit 44 to cause the final count in the auxiliary counter 43 to be transferred into the storage circuit, and a reset pulse is transmitted to the auxiliary counter 43 to reset this counter to zero. This count in the storage circuit 44 is added to the existing count in the main counter 41 in the adder circuit 45. During the next period when the pulse trains are switched to the auxilary counter 43 and the main counter has stabilized, a preset and readout pulse from the sample rate generator 39 opens the gates 46 to permit the summed count in the adder 45 to be preset into the main counter 41 so that the count therein is updated and, simultaneously, this updated digital distance information appears on the distance information output leads 47. Alternative digital distance information may be coupled from the output 42 of the main counter 41, this information lacking only the pulse count in the storage circuit 44 from the last period when the incoming pulse trains were switched to the auxiliary up-down counter 43. Thus it can be seen that the pulses that are interrupted in the flow to the main ripple carry up-down counter are stored during the period that the main counter is stabilizing and being read out, these pulses thereafter being added back into the distance information in the main counter for display during the next readout.

Figure 6:
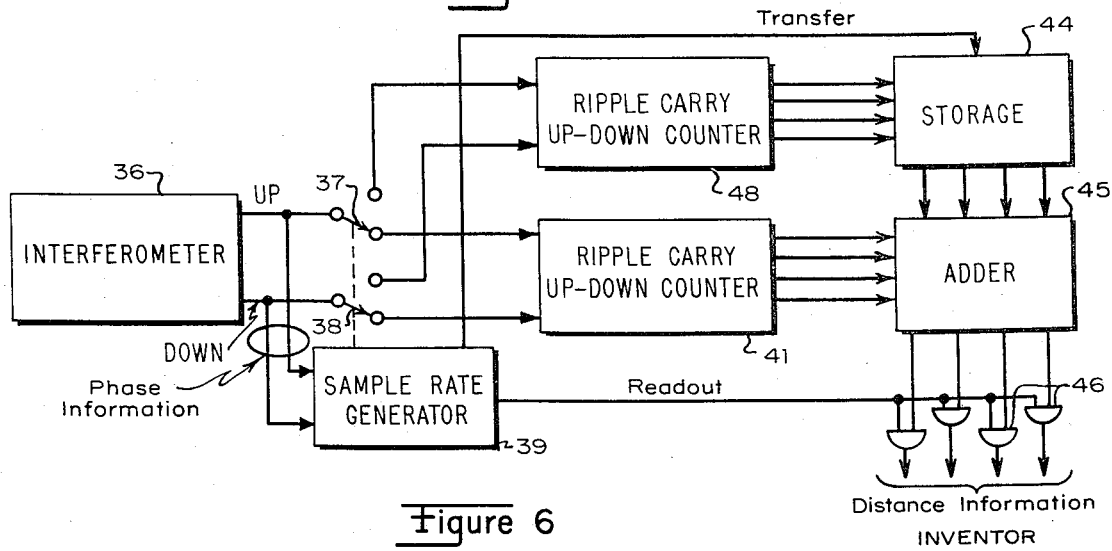
FIG. 6 is a block diagram of another embodiment of the present invention using two ripple carry up-down counters for maintaining an account of the interrupted pulses.

Referring now to FIG. 6 there is shown another system for maintaining an accounting of the interrupted pulses which utilizes two ripple carry up-down counters 41 and 48. One of the counters 41 maintains the count of the incoming pulse trains during the principal portion of the operating time of the system, and the second counter 48 maintains the count of the pulses during the period when the electronic switches 37 and 38 are operated by the sample rate generator 39 to switch from the main counter 41 to the second counter 48 to allow the main counter 41 time to stabilize. During the period the main counter 41 is counting the incoming trains of pulses and after the second counter 48 has had a chance to stabilize, the sample rate generator 39 operates to transmit a transfer pulse to the storage circuit 44 which operates to read out and store the count then existing in the second counter 48. At the next point in time when the readout pulse appears at the gates 46 from the sample rate generator 39 (see FIG 5A, for example), the stabilized count information from the main counter 41 is added in the adder 45 to the stabilized count which has been stored in the storage circuit 44, this summed distance information appearing at the outputs of the gate circuits 46 as digital distance information. This distance information is therefore updated with the exception of the pulses then being stored in the second counter 48 during the readout time of the first counter 41. It should be noted that the two counters 41 and 48 maintain a running count and the information from the second counter 48 is not transferred back into the main counter 41 as was the case in the system of FIG. 5.

Figure 7A:
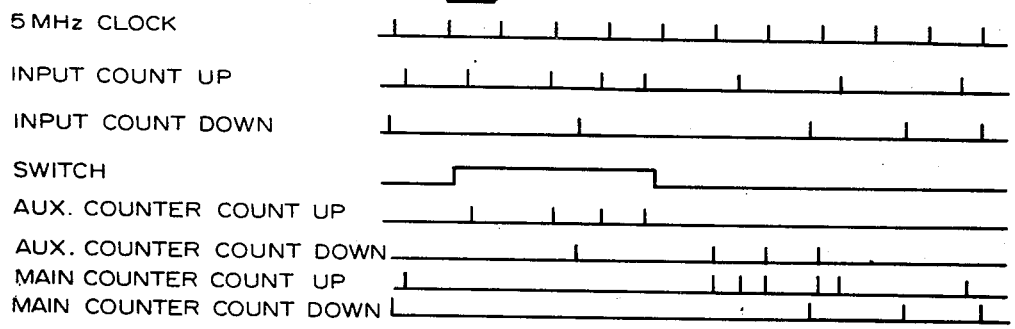
FIG. 7A is a pulse chart showing the timing of the various pulses of FIG. 7.
Figure 7:
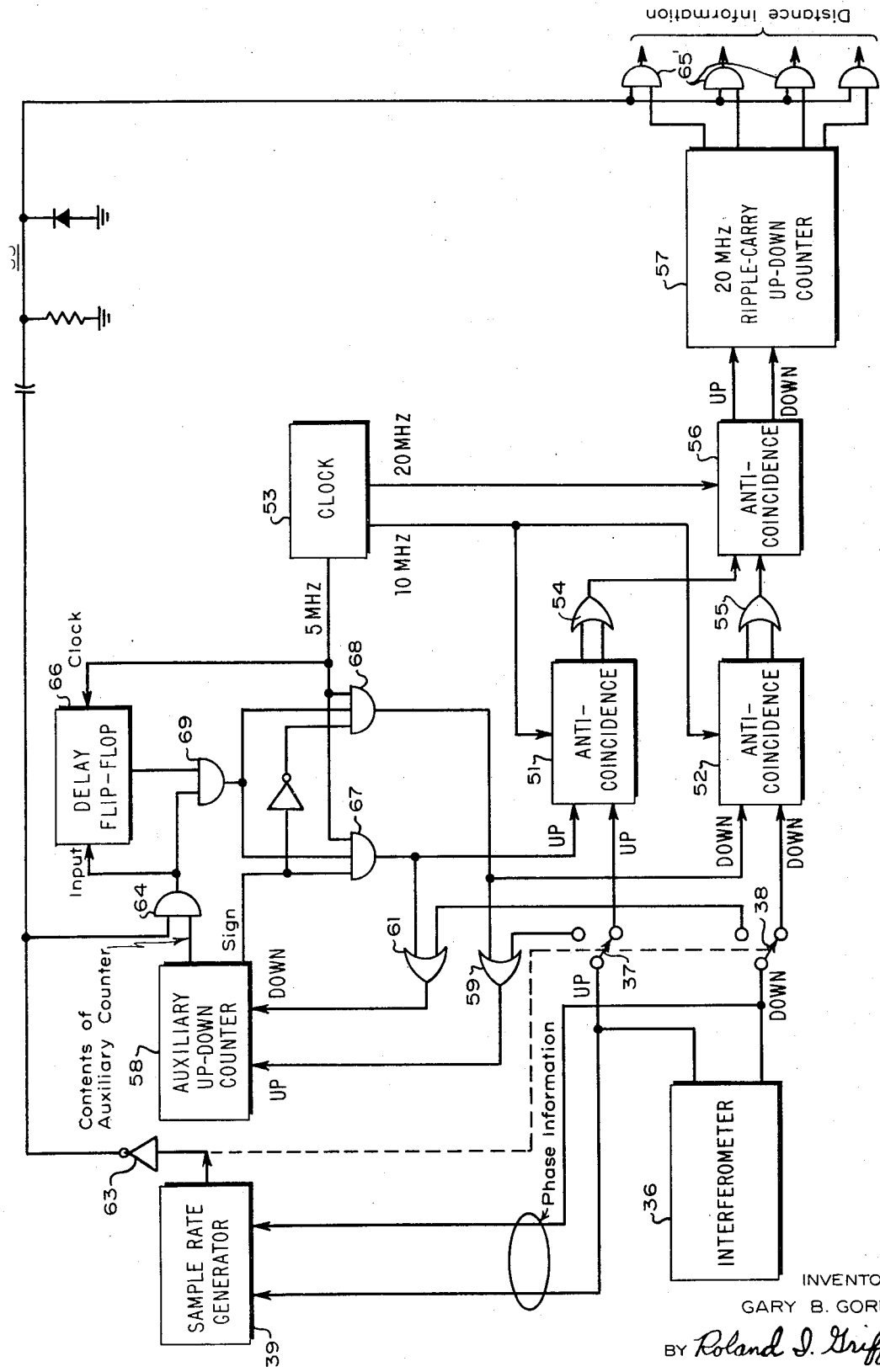
FIG. 7 is a block diagram of still another embodiment of the present invention which employs novel means for adding the interrupted pulses back into the principal counter circuit.

Referring now to FIGS. 7 and 7A, a system employing two pulse anticoincidence circuits 51 and 52 and an auxiliary up-down counter 58 is shown. During the major portion of the operation of the system, the electronic switches 37 and 38 supply the up pulse train and the down pulse train to the anticoincidence circuits 51 and 52, respectively, these circuits receiving synchronizing pulses at the rate of 10 mHz. from the clock 53. The circuits operate to prevent time-coincidence between the up and down pulses coming in from the interferometer 36 with the up and down pulses, respectively, coming from the auxiliary counting system as described below. The two trains of output pulses from each anticoincidence circuit are coupled through OR gates 54 and 55 to a third anticoincidence circuit 56 which receives a 20 mHz. synchronizing pulse train from the clock 53. This third anticoincidence circuit operates to prevent time-coincidence between the up and down pulse trains from the OR gates 54 and 55 and is sometimes included as part of the 20 mHz. ripple carry main up-down counter 57.

When it is desired to stabilize and read out the main up-down counter 57, the incoming pulse trains are switched from the anticoincidence circuits 51 and 52 to the auxiliary up-down counter 58 through the OR gates 59 and 61. The incoming trains of up and down pulses are thereafter stored in the auxiliary counter 58 while the main counter 57 stabilizes. After a sufficient period of time has passed to enable the main counter to stabilize, the sample rate generator 39 actuates the switches 37 to 38 and transfer the incoming pulse trains from the auxiliary counter 58 back to the anticoincidence circuits 51 and 52. At the same time, the output of an inverter circuit 63 driven by sample rate generator 39 enables the AND gate 64 and causes a short positive-going pulse to be formed by the network 65. This short positive-going pulse is applied to one input of each of the gates 65′ connected to the output leads from the main counter 57 and thereby causes the count in the main counter 57 to appear as digital distance information on the output leads of gates 65′.

Immediately after the incoming pulse trains have been switched to the anticoincidence circuits 51 and 52, the presence of a count in the auxiliary counter 58 activates the AND gate 64 and the input of the delay flip-flop circuit 66. The auxiliary counter 58 also supplies the AND gates 67 and 68 with information indicating whether the count in the counter 58 is an up count or a down count so that one or the other of the gates 67 and 68 will be operated dependent upon the sign of the count in the counter. The delay flip-flop 66 receives a 5 mHz. control signal from the clock 53, this control signal also appearing at one input of each of the AND gates 67 and 68. As long as the delay flip-flop is set and its input from gate 64 is activated, 5 mHz. clock pulses are allowed to pass through gate 67 or gate 68. These pulses are fed back to the auxiliary counter up or down input via gates 59 and 61 and to an up or down input of one of the anticoincidence circuits 51 or 52. Each pulse applied to the up or down input of one or the other of the anticoincidence circuits 51 or 52 is applied via the associated OR gate 61 or 59 to the down or up input, respectively, of the auxiliary counter 58 so that the auxiliary counter will count down or up until it reaches the zero position, at which time the count content of the auxiliary counter will have been completely removed and assimilated in the appropriate anticoincidence circuit 51 or 52 with the incoming up or down count from the interferometer 36. At this time gates 64, 69, 67, and 68 close, and no more pulses are needed or allowed to pass. In this manner the pulse count which had been removed from the flow of incoming pulses into the main counter 57 during the stabilizing time of the main counter 57 is fed back into the flow of incoming pulses after the incoming pulse trains have been switched back to the main counter 57. The previously removed pulse count is therefore assimilated into the main counter 57 before the next readout time when the switches 37 and 38 will again be operated by the sample rate generator 39 to switch the incoming trains of pulses from the anticoincidence circuits 51 and 52 to the auxiliary up-down counter 58.

I claim:

1. A pulse counting system comprising a pair of input terminals for receiving two continuous trains of incoming pulses, a first digital counter circuit for providing a difference tally count between the pulses in said two continuous trains of incoming pulses, first means coupled between said input terminals and said first counter circuit for normally supplying said two continuous trains of incoming pulses from said input terminals to said first counter circuit and for periodically interrupting the flow of pulses in each of said two continuous trains of incoming pulses from said input terminals to said first counter circuit, two continuous said first counter circuit stabilizing during each such period of interruption, second means for extracting the difference tally count from said first counter circuit after the first counter circuit has stabilized, and third means coupled to said first means, for controlling said first means and accounting for the number of pulses in each of said trains of incoming pulses during each such period of interruption to provide a final difference tally count in which no counts are lost.

2. A pulse counting system as in claim 1 including a laser interferometer for producing one of said trains of incoming pulses as an up count output and the other of said trains of incoming pulses as a down count output.

3. A pulse counting system as in claim 1 wherein said third means comprises counting means for counting a like plurality of pulses from each of said trains of incoming pulses and eliminating said like plurality of pulses from the flow of pulses to said first counter circuit.

4. A pulse counting system as in claim 1 wherein said first and third means comprise a pair of selective pulse remover circuits, each being associated with a different one of said trains of incoming pulses, each including a second counter circuit for counting a like plurality of pulses in the associated one of said trains of incoming pulses, each including means coupled between a different one of said input terminals and said first digital counter circuit for switching the associated one of said trains of incoming pulses from said first counter circuit to the included second counter circuit, and each including means coupled to said last mentioned means and responsive to receipt of the last pulse of said like plurality of pulses in the associated one of said trains of incoming pulses by the included second counter circuit for switching the associated one of said trains of incoming pulses back to said first counter circuit.

5. A pulse counting system as in claim 4 including a laser interferometer for producing one of said trains of incoming pulses as an up count output and the other of said trains of incoming pulses as a down count output.

6. A pulse counting system as in claim 4 wherein said first counter circuit comprises a reversible counter for receiving said trains of incoming pulses and producing a difference tally count representing the difference in the number of pulses therein.

7. A pulse counting system as in claim 4 wherein each of said second counter circuits includes a decade counter.

8. A pulse counting system as in claim 4 wherein said first counter circuit includes one or more digital counters and a shift register coupled thereto, and wherein each of said selective pulse remover circuits includes means responsive to receipt of a pulse prior to said last pulse of said like plurality of pulses in in the associated one of said trains of incoming pulses by the included second counter circuit for transferring the count in said one or more digital counters to said shift register.

9. A pulse counting system as in claim 1 wherein said first counter circuit comprises two up counters, one of said up counters counting the pulses from one of said trains of incoming pulses and the other of said up counters counting the pulses from the other of said trains of incoming pulses, and a subtractor circuit coupled to outputs of said up counters for determining the difference between the two pulse counts.

10. A pulse counting system as in claim 9 wherein said first and third means comprise a pair of selective pulse remover circuits, each being associated with a different one of said trains of incoming pulses and being coupled to an associated different one of said up counters, each including an additional counter circuit for counting a like plurality of pulses in the associated one of said trains of incoming pulses, each including means coupled between a different one of said input terminals and the associated one of said up counters for switching the associated one of said trains of incoming pulses from the associated one of said up counters to the included additional counter circuit, and each including means coupled to said last-mentioned means and responsive to receipt of the last pulse of said like plurality of pulses in the associated one of said trains of incoming pulses by the included additional counter circuit for switching the associated one of said trains of incoming pulses back to the associated one of said up counters.

11. A pulse counting system as in claim 10 wherein each of said additional counter circuits comprises a decade counter.

12. A pulse counting system as in claim 1 wherein said third means comprises a second counter circuit for tally counting the pulses from both of said trains of incoming pulses during each such period of interruption, and fourth means for adding the tally pulse count from said second counter circuit to the difference tally count from said first counter circuit.

13. A pulse counting system as in claim 12 including a laser interferometer for producing one of said trains of incoming pulses as an up count output and the other of said trains of incoming pulses as a down count output.

14. A pulse counting system as in claim 12 wherein said fourth means comprises storage means for storing the count from said second counter circuit after each such period of interruption, and an addition circuit coupled to an output of said storage means and to an output of said first counter circuit.

15. A pulse counting system as in claim 14 including means for presetting an output count from said addition circuit into said first counter circuit.

16. A pulse counting system as in claim 12 wherein said fourth means comprises a pair of anticoincidence circuits, each being coupled to a different one of said input terminals, and means for coupling an output of said second counter circuit to said anticoincidence circuits for adding pulses from said second counter circuit into the trains of incoming pulses received by said first counter circuit.

17. A pulse counting system as in claim 16 including a laser interferometer for producing one of said trains of incoming pulses as an up count output and the other of said trains of incoming pulses as a down count output.

18. A pulse counting system as in claim 1 wherein said third means comprises means for accounting for the number of pulses in each of said trains of incoming pulses during each such period of interruption and modifying the difference tally count from said first counter circuit in accordance with this accounting to provide a final difference tally count in which no counts are lost.

References Cited

UNITED STATES PATENTS

| | | | |
|---|---|---|---|
| 2,992,384 | 7/1961 | Malbrain | 324—78 D |
| 3,422,422 | 1/1969 | Frank | 235—92 EA |
| 3,500,123 | 3/1970 | Arrowood | 235—92 PL |
| 3,199,104 | 8/1965 | Miller | 235—92 EA |
| 3,585,376 | 6/1971 | Toscano | 235—92 PL |

MAYNARD R. WILBUR, Primary Examiner

R. F. GNUSE, Assistant Examiner

U.S. Cl. X.R.

235—92 R, 92 CC, 92 EC, 92 FQ; 324—78 D